US008112498B2

(12) United States Patent
Komiya et al.

(10) Patent No.: US 8,112,498 B2
(45) Date of Patent: Feb. 7, 2012

(54) MAPPING BETWEEN OBJECTS REPRESENTING DIFFERENT NETWORK SYSTEMS

(75) Inventors: Noriyuki Komiya, Tokyo (JP); Noriyuki Kushiro, Tokyo (JP); Yoshiaki Ito, Tokyo (JP); Masanori Nakata, Tokyo (JP); Shigeki Suzuki, Tokyo (JP); Yoshiko Ochiai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 959 days.

(21) Appl. No.: 10/466,600

(22) PCT Filed: Nov. 13, 2002

(86) PCT No.: PCT/JP02/11820
§ 371 (c)(1),
(2), (4) Date: Jul. 18, 2003

(87) PCT Pub. No.: WO03/044674
PCT Pub. Date: May 30, 2003

(65) Prior Publication Data
US 2004/0059814 A1    Mar. 25, 2004

(30) Foreign Application Priority Data

Nov. 19, 2001   (JP) ................................. 2001-352881
Mar. 28, 2002   (JP) ................................. 2002-090492

(51) Int. Cl.
*G06F 15/16* (2006.01)
(52) U.S. Cl. ........................................................ 709/218
(58) Field of Classification Search .................. 709/203, 709/217–219, 220–222, 223, 224, 249; 707/1, 707/10, 102, 103 R, 103 Y
See application file for complete search history.

(56) References Cited

U.S. PATENT DOCUMENTS

| 4,763,104 | A | * | 8/1988 | Inoue et al. ................ 375/257 |
| 5,499,371 | A | * | 3/1996 | Henninger et al. .......... 717/108 |
| 5,586,254 | A | * | 12/1996 | Kondo et al. ................ 714/25 |
| 5,611,059 | A | * | 3/1997 | Benton et al. ............... 715/734 |
| 5,627,972 | A |   | 5/1997 | Shear |

(Continued)

FOREIGN PATENT DOCUMENTS

EP    0 786 882    7/1997

(Continued)

OTHER PUBLICATIONS

Japanese Office Action dated Aug. 5, 2005 and English translation.

(Continued)

*Primary Examiner* — Jeffrey Pwu
*Assistant Examiner* — Scott M Sciacca
(74) *Attorney, Agent, or Firm* — Buchanan Ingersoll & Rooney PC

(57) ABSTRACT

To provide an easy and simple mapping between objects representing different network systems A and B. In the configuration where data of an object, a system component, is available in another system, it is provided with an intermediate model 102 which is mutually accessible. The intermediate model has an intermediate object 103 corresponding to a component. Each system performs mapping to the intermediate object 103 an item of a corresponding component 106 of the system, and transmits data to an mapped item. In addition, the system accesses the intermediate object to obtain data corresponding to the item when component data of the other system is needed.

7 Claims, 13 Drawing Sheets

U.S. PATENT DOCUMENTS

| | | | |
|---|---|---|---|
| 5,764,955 | A | 6/1998 | Doolan |
| 5,946,693 | A | 8/1999 | Mizuyama et al. |
| 5,960,176 | A * | 9/1999 | Kuroki et al. ............. 709/223 |
| 6,104,963 | A * | 8/2000 | Cebasek et al. ............. 700/86 |
| 6,141,595 | A * | 10/2000 | Gloudeman et al. ............. 700/83 |
| 6,192,282 | B1 * | 2/2001 | Smith et al. ............. 700/19 |
| 6,470,223 | B1 | 10/2002 | Naganuma |
| 6,487,457 | B1 * | 11/2002 | Hull et al. ............. 700/17 |
| 6,766,390 | B2 * | 7/2004 | Komiya et al. ............. 710/62 |
| 6,836,796 | B2 * | 12/2004 | Schwartz et al. ............. 709/223 |
| 7,305,697 | B2 * | 12/2007 | Alao et al. ............. 725/114 |
| 2002/0010590 | A1 * | 1/2002 | Lee ............. 704/277 |
| 2002/0016639 | A1 * | 2/2002 | Smith et al. ............. 700/9 |
| 2002/0031281 | A1 * | 3/2002 | Chiba et al. ............. 382/305 |
| 2002/0133581 | A1 * | 9/2002 | Schwartz et al. ............. 709/223 |
| 2006/0009861 | A1 * | 1/2006 | Bonasia et al. ............. 700/18 |

FOREIGN PATENT DOCUMENTS

| | | | |
|---|---|---|---|
| EP | 1 058 428 | | 12/2000 |
| JP | 5-173795 | | 7/1993 |
| JP | 6-152681 | | 5/1994 |
| JP | 6-169315 | | 6/1994 |
| JP | 7-297878 | | 11/1995 |
| JP | 10-133875 | | 5/1998 |
| JP | 2000-090057 | | 3/2000 |
| JP | 2000-244551 | | 9/2000 |
| JP | 2000244551 | * | 9/2000 |
| JP | 2001-256122 | | 9/2001 |
| WO | WO 99/07109 | A | 2/1999 |
| WO | WO 99/57837 | | 11/1999 |
| WO | WO 00/70834 | | 11/2000 |

OTHER PUBLICATIONS

Chang (NETLABS) et al., "ISO/CCITT and Internet Management Coexistence (IIMC): ISO/CCITT to Internet Management Proxy" IETF Standard-Working-Draft, Internet Engineering Task Force, IETF, CH, 1994, No. 4 pp. 1-5, 1-63, A-1, B-1-B3, C-1, D-1-D-4.

Mazumdar et al., "Design of Protocol Independent Management Agent to Support SNMP and CMIP Queries" Integrated Network Management, III Proceeding 3rd International Symposium, 1993, vol. C12, pp. 377-388.

Supplementary European Search Report Application/Patent No. 02781747.7-2416 dated Mar. 27, 2008.

Agoulmine, Nazim et al., "A system architecture for updating management information in heterogeneous networks." Communication for Global Users. Including a Communications Theory Mini Conference. Orlando, Dec. 6-9, 1992. Proceedings of the Global Telecommunications Conference (GLOBECOM), New York, US, IEEE, vol. 1, Dec. 6, 1992, pp. 999-1003.

Supplemental Partial European Search Report dated Sep. 4, 2007 in corresponding European Patent Application No. EP 02 78 1747.

Chinese Office Action issued Jul. 10, 2009 in corresponding Chinese Patent Application No. 2005100543916 and partial English translation thereof.

Office Action issued Feb. 23, 2010 in corresponding Chinese Application No. 2005100543916 and partial English translation.

European Office Action issued Sep. 28, 2010 in corresponding European Patent Application No. 02 781 747.7-2416.

Office Action of Nov. 18, 2010 issued in Canadian Patent Application No. 2,435,068.

European Office Action dated Jul. 8, 2011.

* cited by examiner

Fig. 9
(a)
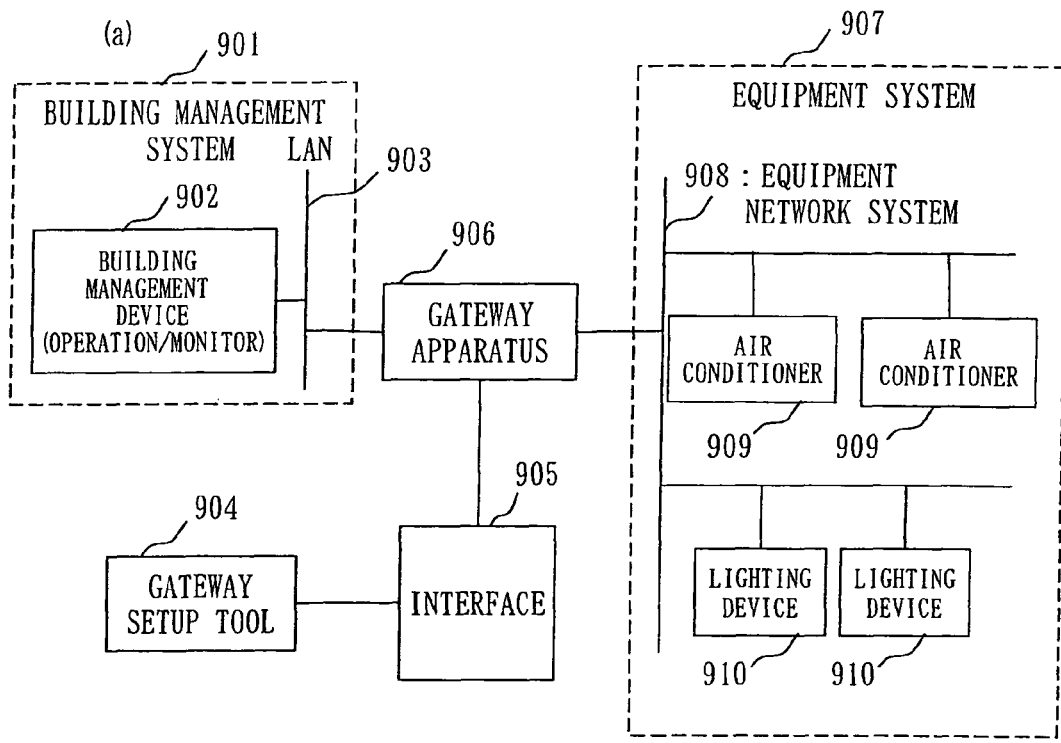
(b)
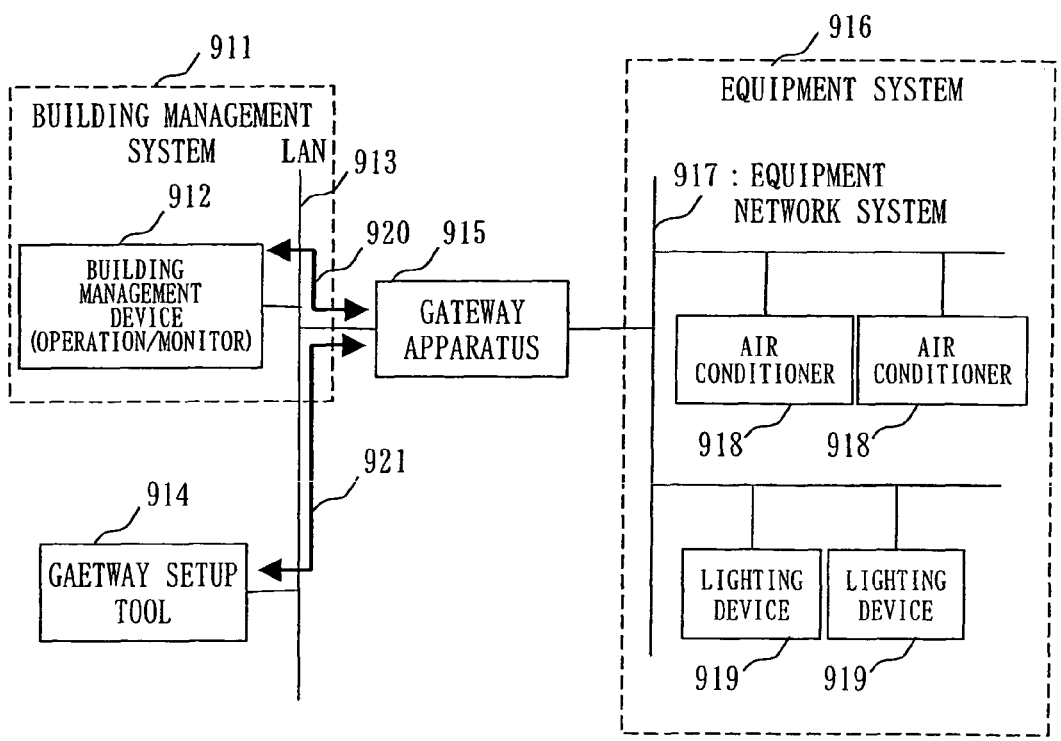

SYSTEM A OBJECT SETUP DATA (EXAMPLE)

<LOGICAL_VALUE OBJECT_NUMBER="5001" CURRENT_VALUE="1" INSTALLATION_LOCATION="J201"/>   1203
<LOGICAL_VALUE OBJECT_NUMBER="5002" CURRENT_VALUE="1" INSTALLATION_LOCATION="J201"/>
<LOGICAL_VALUE OBJECT_NUMBER="5003" CURRENT_VALUE="0" INSTALLATION_LOCATION="J202"/>
<LOGICAL_VALUE OBJECT_NUMBER="5004" CURRENT_VALUE="0" INSTALLATION_LOCATION="J202"/>   1204
<INTEGER_VALUE OBJECT_NUMBER="5101" CURRENT_VALUE="3" INSTALLATION_LOCATION="J201"/>
<INTEGER_VALUE OBJECT_NUMBER="5102" CURRENT_VALUE="3" INSTALLATION_LOCATION="J202"/>

1202

SYSTEM B OBJECT SETUP DATA (EXAMPLE)

<AIR_CONDITIONER UNIT_NUMBER="1401" START/STOP="START" OPERATION_MODE=   1205
="COOLING" INSTALLATION_LOCATION="J201"/>
<AIR_CONDITIONER UNIT_NUMBER="1402" START/STOP="STOP" OPERATION_MODE=
="COOLING" INSTALLATION_LOCATION="J202"/>
<LIGHTING_DEVICE UNIT_NUMBER="2001" LIGHT-ON/LIGHT-OFF="ON" INSTALLATION_LOCATION="J201"/>
<LIGHTING_DEVICE UNIT_NUMBER="2001" LIGHT-ON/LIGHT-OFF="OFF" INSTALLATION_LOCATION="J202"/>

Fig. 13

```
MAPPING SETUP DATA (EXAMPLE)
<MAPPING_RECORD
  OBJECT_A="AIR_CONDITIONER"    UNIT_NUMBER="1401"    PROPERTY_A="START/STOP"
  OBJECT_B="LOGICAL_VALUE"      OBJECT_NUMBER="5001"  PROPERTY_B="CURRENT_VALUE"/>
<MAPPING_RECORD
  OBJECT_A="AIR_CONDITIONER"    UNIT_NUMBER="1401"    PROPERTY_A="OPERATION_MODE"
  OBJECT_B="INTEGER_VALUE"      OBJECT_NUMBER="5101"  PROPERTY_B="CURRENT_VALUE"/>
<MAPPING_RECORD
  OBJECT_A="LIGHTING_DEVICE"    UNIT_NUMBER="2001"    PROPERTY_A="LIGHT-ON/LIGHT-OFF"
  OBJECT_B="LOGICAL_VALUE"      OBJECT_NUMBER="5002"  PROPERTY_B="CURRENT_VALUE"/>
<MAPPING_RECORD
  OBJECT_A="AIR_CONDITIONER"    UNIT_NUMBER="1402"    PROPERTY_A="START/STOP"
  OBJECT_B="LOGICAL_VALUE"      OBJECT_NUMBER="5003"  PROPERTY_B="CURRENT_VALUE"/>
<MAPPING_RECORD
  OBJECT_A="AIR_CONDITIONER"    UNIT_NUMBER="1402"    PROPERTY_A="OPERATION_MODE"
  OBJECT_B="INTEGER_VALUE"      OBJECT_NUMBER="5102"  PROPERTY_B="CURRENT_VALUE"/>
<MAPPING_RECORD
  OBJECT_A="LIGHTING_DEVICE"    UNIT_NUMBER="2002"    PROPERTY_A="LIGHT-ON/LIGHT-OFF"
  OBJECT_B="LOGICAL_VALUE"      OBJECT_NUMBER="5004"  PROPERTY_B="CURRENT_VALUE"/>
```

1301
1302

MAPPING BETWEEN OBJECTS REPRESENTING DIFFERENT NETWORK SYSTEMS

TECHNICAL FIELD

The present invention relates to a gateway apparatus connecting two or more network systems with one another for exchanging data, a gateway setup tool performing a setup of the gateway apparatus, a setup of intermediate object and its use.

BACKGROUND ART

Conventionally, some gateway apparatuses are placed between a network transmitting and receiving a command for monitoring or controlling building equipment such as air conditioning or lighting equipment installed in a building or the like and a host system of building management performing a total operation of monitoring and controlling an equipment group of those. Others are placed between two or more network systems whose protocols are different from each other. The conventional gateway apparatuses mutually connect those networks and systems. According to those conventional gateway apparatuses, an object handling the systems to be processed and mapping to an object as a mutual correspondence are to be set up individually for each system and held in software produced for each applicable article in some cases. In other cases, several preset items of setup information are held and one to be used is selected from among those. Accordingly, it is necessary to update software when the setup information is altered.

As a second conventional example, some including Japanese Unexamined Patent Publication No. HEI 05-173795 are directed to solving such a problem. They are provided with a relation management object for managing bi-directional related information between two or more objects. Then, it attempts to perform the maintenance of mapping and the like between objects by handling this relation management object.

According to the conventional gateway apparatuses mentioned above which have built-in individual software provided for each article, data is exchanged by way of a gateway apparatus which has built-in software holding statistically objects handled by the network systems of both sides and mapping relating information as a mutual correspondence, in the case where a network transmitting and receiving a monitor or control command to and from building equipment such as air conditioning or lighting equipment and a building management system which performs a total operation of controlling and monitoring a group of such equipment are configured based on different protocols from each other in a building system, for example.

For that reason, it is needed to update the software itself when the setup information is altered. As a result, a lot of time and cost are required when the state of a system connected has been changed or the mapping specification has been altered.

Still more, in the case of connecting a large number of network systems to one another, since it is necessary that the gateway apparatus should hold all the information relating to those connected networks, a larger amount of memory capacity is required. Therefore the gateway apparatus has become expensive.

As a third conventional and concrete example, Japanese Unexamined Patent Publication No. HEI 6-169315 has proposed a method for solving such a problem. According to this method, mapping information is generated according to a connected system through a mapping process provided on the gateway apparatus. Then, the mapping information is updated according to a change in the state of a connected system through a mapping update process provided on the gateway apparatus.

A setup of mapping information in the conventional gateway apparatuses is made as mentioned above. This has posed a problem of a lot of time and cost required when a connected system has a change in such as its configuration or the mapping specification (correspondence) is altered.

Another problem is that since a setup of mapping requires full knowledge of the connected systems of both parties and deep understanding of interrelation with the object relating to the systems, a highly skilled engineer is needed.

With referring to the second conventional example, the mapping information between the objects of both parties is held by the relation management object. For that reason, a mapping setter should have full knowledge of the systems of both parties for mapping at the same time. Another problem is that when a change occurs with one system, it is needed that the setup of mapping is reset and made again under reconsideration of the state of the other system.

With referring to the third conventional example, the generation and updating process of mapping is performed on the gateway apparatus. For that reason, in order to handle a change in the system to be processed and an alteration in the mapping algorithm and the like, it is needed to update the built-in software.

In addition, since the generation and updating process is performed on the gateway apparatus, the processing load of the gateway apparatus becomes large. As a result, the gateway apparatus becomes expensive.

The present invention is directed to solving such problems mentioned above. It is an object to obtain the mapping device for gateway apparatus in which a setup of mapping may be made without full knowledge of the network system of the other party in the system where an interconnection is made between different network systems A and B run based on different protocols from each other through a mutual mapping of objects representing the respective systems. In addition, it is designed that even if a change occurs in one of the network systems, the change does not influence the setup information of the other network system.

In addition, it provides simple and easy development in setup, monitor and control by using a view, so that the format is intelligible for the user as well.

Another object is to generate a more precise and appropriate mapping.

Still another object is to obtain the apparatus which is responsive to an operation based change in the network system without difficulties.

Still another object is to provide the gateway apparatus which requires neither updating built-in software provided in the gateway apparatus nor having complicated operations performed on the gateway apparatus such as the generation and updating process of mapping information based on setup data even when a connected system is changed, the mapping specification is altered, or the mapping algorithm is changed. Hence, the development cost, engineering cost, and hardware cost of the gateway apparatus are held down low.

Still another object is to provide the gateway setup tool which allows an easy setup without full knowledge of interrelation between the connected systems of both parties. In addition, it is possible to use a sophisticated user interface in making a setup. Hence, the setup efficiency and the engineering cost of the gateway setup tool are high and held down low, respectively.

Still another object is to provide the gateway apparatus and the gateway setup tool which may be produced by using a generally and widely available application program such as a WEB browser. Hence, the development cost and the engineering cost of the gateway apparatus and the gateway setup tool are held down low.

DISCLOSURE OF THE INVENTION

A gateway apparatus according to the present invention is provided in a configuration where data of an object representing a component of a system is available for another system.

The gateway apparatus includes an intermediate model which is set up by one system, and the intermediate model includes an intermediate object corresponding to the component. The one system maps an item of a corresponding component of the one system to the intermediate object, and transfers data to a mapped item.

Then, the another system obtains the data corresponding to the item of the intermediate object when the data of the intermediate object is needed as component data.

Alternatively, it is in a configuration where the data of an object is mutually used by another systems, when the data is defined as a component composing a system.

It is provided with an intermediate model which is mutually accessible. This intermediate model has an intermediate object which corresponds to the component therein. Each system maps an item of a corresponding component of itself to the intermediate object, and transmits data to a mapped item. Then, the each system, when component data of the another system is needed, accesses the intermediate object to obtain the data corresponding to the item.

In addition, each system, when accessing the data of the intermediate object, performs mapping to the intermediate object whose component items agree more than a predetermined rate with items to be accessed of the each system as the intermediate object.

Still further, the intermediate object is added with supplemental information, and each system accesses the intermediate object based on the supplemental information.

Still further, when mapping is performed between the system and the intermediate model, the intermediate model and its intermediate objects, and the system and its components are displayed on the same screen.

Still more, mapping to the intermediate object is performed by data which is written in a structured data description language.

It comprised a system A communicating section transmitting and receiving a communication command A of a system A, a system B communicating section transmitting and receiving a communication command B of a system B built on a protocol which is different from a protocol on which the system A is built, a system A object database exchanging the communication command A with the system A, interpreting a content of the communication command A, and holding object data, a system B object database exchanging the communication command B with the system B, interpreting a content of the communication command B, and holding object data, a mapping database holding mapping data representing a correspondence between the object data of the system A object database and the object data of the system B object database, a mapping executing section exchanging object data A with the system A object database, exchanging object data B with the system B object database, performing mapping between the object data A and the object data B based on the mapping database, and mutually exchanging the object data A and the object data B, and a setup data transmitting and receiving section exchanging the object data A with the system A object database, exchanging the object data B with the system B object database, exchanging the mapping data with the mapping database, and exchanging the object data A, the object data B, and the mapping data with an external device.

A gateway setup tool according to the present invention includes a setup data inputting section setting up groups of objects representing a system A and a system B, respectively, a system A object setup database holding object data of the system A which is set up by the setup data inputting section, a system A object data processing section receiving data from the system A object setup database, compressing the data, and returning it, an all system A object database including model data of an object available for the system A which exchanges data with the system A object setup database, a system B object setup database holding object data of the system B which is set up by the setup data inputting section, a system B object data processing section receiving data from the system B object setup database, compressing the data, and returning it, an all system B object database including model data of an object available for the system B which exchanges data with the system B object setup database, a mapping setup database holding mapping data for mapping which is set up by the setup data inputting section, a mapping data processing section receiving data from the mapping setup database, compressing the data, and returning it, an all mapping database including model data of mapping between an object available for the all system A object database and an object available for the all system B object database, and exchanging data with the mapping setup database, a mapping generating section performing mapping between each data of the system A object setup database and each data of the system B object setup database with reference to the all mapping database, and transmitting it to the mapping setup database, a setup data displaying section displaying data as needed of the system A object setup database, the system B object setup database, the mapping setup database, the all system A object database, the all system B object database, or the all mapping database, and a setup data transmitting and receiving section for exchanging data among the system A object setup database, the system B object setup database, and the mapping setup database. Then, the gateway setup tool transmits and receives data to and from the gateway apparatus through the setup data transmitting and receiving section.

In addition, it is configured to assign supplemental information for mapping to object setup data of one of the system A object setup database and the system B object setup database, so that the mapping generating section generates mapping data between objects based on the supplemental information.

In addition, it is configured to exchange data written in a structured data description language with the gateway apparatus.

In addition, it is configured to exchange data written in a structured data description language with the gateway setup tool.

BRIEF DESCRIPTION OF DRAWINGS

FIG. 9 is a block diagram illustrating connection types between the gateway apparatus and the gateway setup tool according to the fourth embodiment of the present invention;

FIG. 12 shows an example of the system A object setup data and the system B object setup data in the gateway setup tool which are written in a structured data description language according to a sixth embodiment of the present invention; and FIG. 13 shows an example of the mapping setup data in the gateway setup tool which is written in the structured data description language according to the sixth embodiment of the present invention.

BEST MODE FOR CARRYING OUT THE INVENTION

Embodiment 1.

Figure 1:
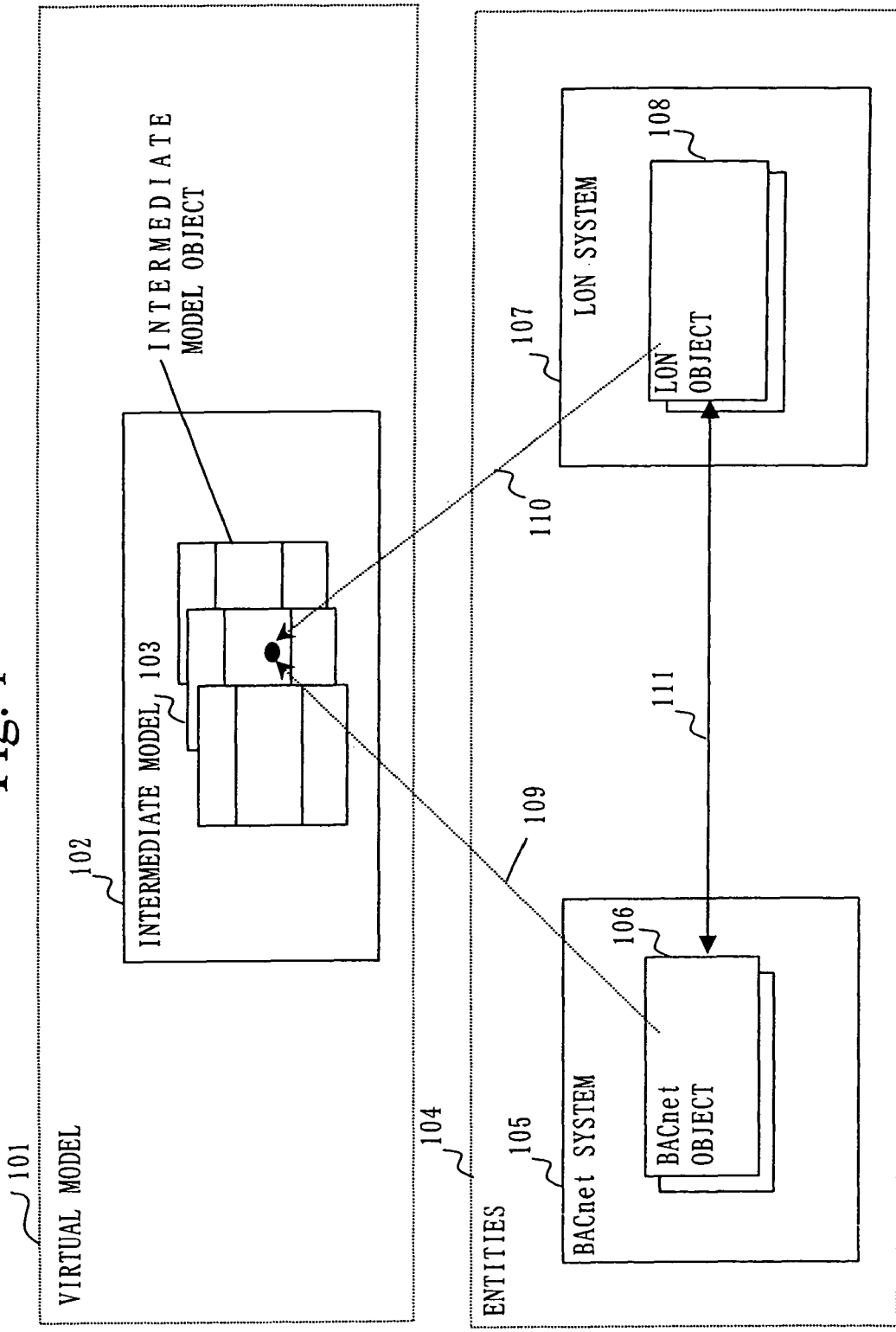
FIG. 1 is a conceptual view illustrating mapping of intermediate models between systems according to a first embodiment of the present invention.

A first embodiment of the present invention will be discussed below with reference to FIG. 1, FIG. 2 and FIG. 3. FIG. 1 is an explanatory block diagram of a system for implementing inter-network mapping performed between different networks according to the present invention.

The figure shows a BACnet system 105 and a LON system 107 as an example of networks to be connected to each other. These are objects as real entities.

Mapping and connecting these systems mutually means that setting up an inter-object mapping 111, or establishing a correspondence between a BACnet object 106 defined by the BACnet system 105 and a LON object 108 defined by the LON system 107.

With this embodiment, a shared concept, a characteristic, an original model or the like of these systems as real entities is used and introduced to establish an intermediate model 102 as an unreal and virtual model. A setup of mapping of an object of each network system is not performed directly between the real BACnet object 106 and the real LON object 108 by themselves, but performed to an intermediate model object 103 defined by this intermediate model 102. For example, the BACnet object 106 is not mapped directly to the LON object 108, but to the intermediate model object 103 (step 109). (Hereinafter, a step is used to express such an operation.) Similarly, the LON object 108 is not directly mapped to the BACnet object 106, but to the intermediate model object 103 (step 110). As a result, the BACnet object 106 and the LON object 108 as objects of the systems of real entities have been mapped to the shared intermediate object 103, which establishes the setup 111 that they have been mapped to each other.

Figure 2:
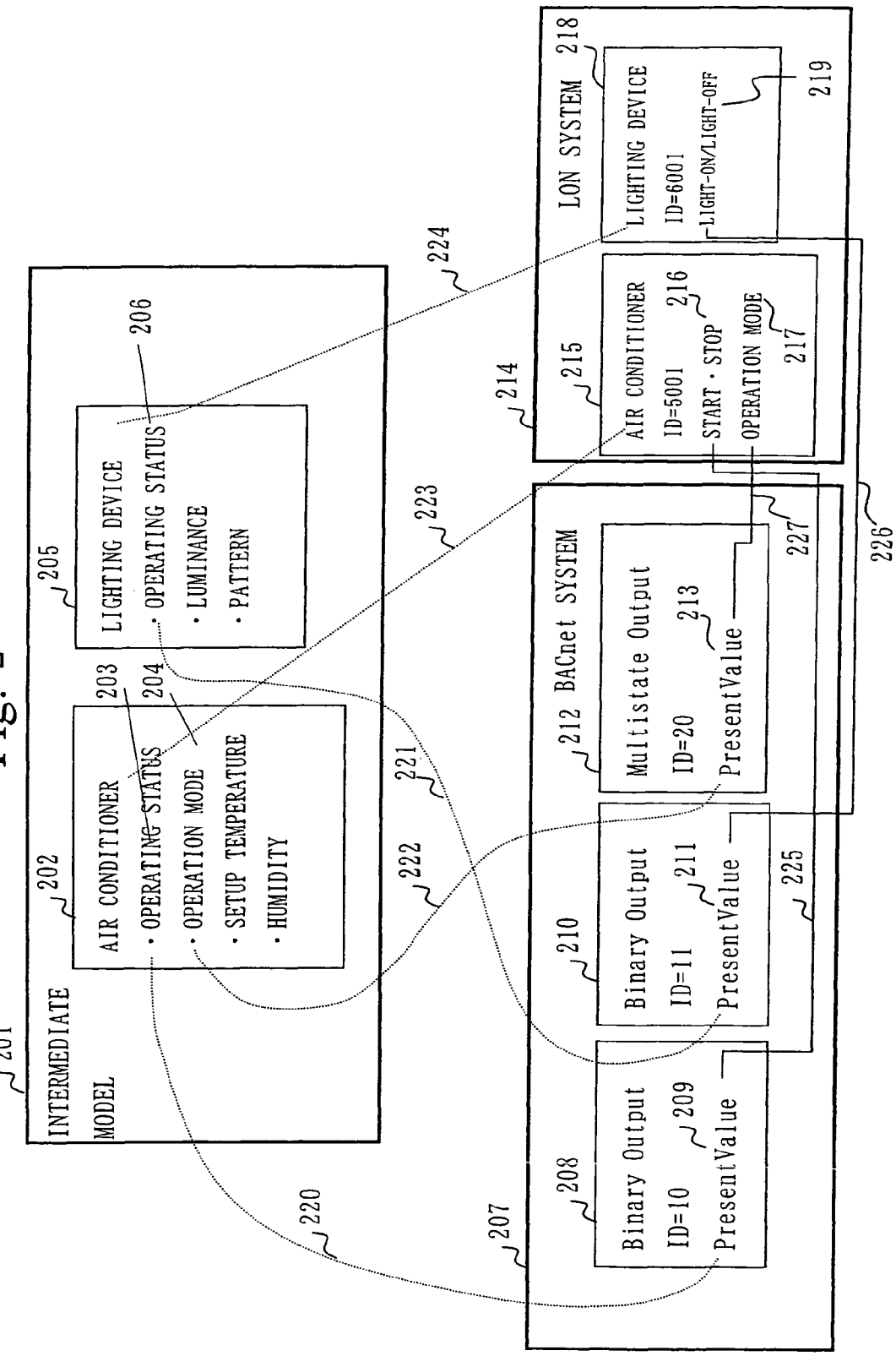
FIG. 2 is a structural view illustrating mutually used systems and an intermediate model in concrete according to the first embodiment.

Next, FIG. 2 shows a concrete example in a very simple format.

Note, a BACnet system 207 and a LON system 214 are adopted as before as systems as real entities. Although an intermediate model 201 established based on these systems is configured similar to the object of the LON system here since the substance of the apparatus is f considered, it is an original model.

First, a description will be given assuming that mapping is performed to the intermediate model 201 from the BACnet system 207. It is assumed that with a Binary Output object 208 with ID=10 which is a BACnet object, a Present Value property 209 is mapped to an Operating Status property 203 of an air conditioner 202 which is an intermediate model object on a property basis (step 220). Similarly, Present Value 211 of a Binary Output object 210 with ID=11 is mapped to an Operating Status 206 of a lighting device 205 (step 221). Present Value 213 of a Multistate Output object 212 is mapped to an Operation Mode 204 of the air conditioner 202 (step 222). This completes a setup on the BACnet side.

Then, mapping is performed to the intermediate model 201 from the LON system 214. It is assumed that an Air Conditioner object 215 with ID=5001, an LON object, is mapped to an air conditioner 202 of an intermediate model object on an object basis (step 223). Similarly, a lighting device 218 of an LON object is also mapped to the lighting device 205 of an intermediate model object on an object basis (step 224).

For an object based mapping, a property level mapping is performed collectively in objects. As a result, a Start/Stop property 216 and an Operation Mode property 217 of the air conditioner 215 of an LON object are mapped, respectively, to the Operating Status property 203 and the Operation Mode property 204 of the air conditioner 202 of an intermediate model object. Similarly, a Light-On/Light-Off property 219 of the Lighting Device object 218 is mapped to the Operating Status property 206 of the Lighting Device object 205 (step 224). This completes a setup also on the LON side.

After completing the setup on each side, a setup of mapping between real entity objects, i.e., a BACnet object and an LON object here, is obtained based on a setup status on the intermediate model 201. With the air conditioner 202 of an intermediate model object, the Present Value property 209 of the Binary Output 208 in a BACnet object and the Start/Stop property 216 of the air conditioner 215 in an LON object are mapped to the Operating Status property 203. This proves that the Present Value property 209 of the Binary Output 208 in a BACnet object and the Start/Stop property 216 of the air conditioner 215 in an LON object have been mapped consequently to each other in real term (step 225). Similarly, it is proved that the Present Value 211 of the Binary Output 210 is mapped to the Light-On/Light-Off property 219 of the lighting device 218 (step 226), and the Present Value 213 of the Multistate Output 212 is mapped to the Operation Mode property 217 of the air conditioner 215 in real term (step 227).

Figure 3:
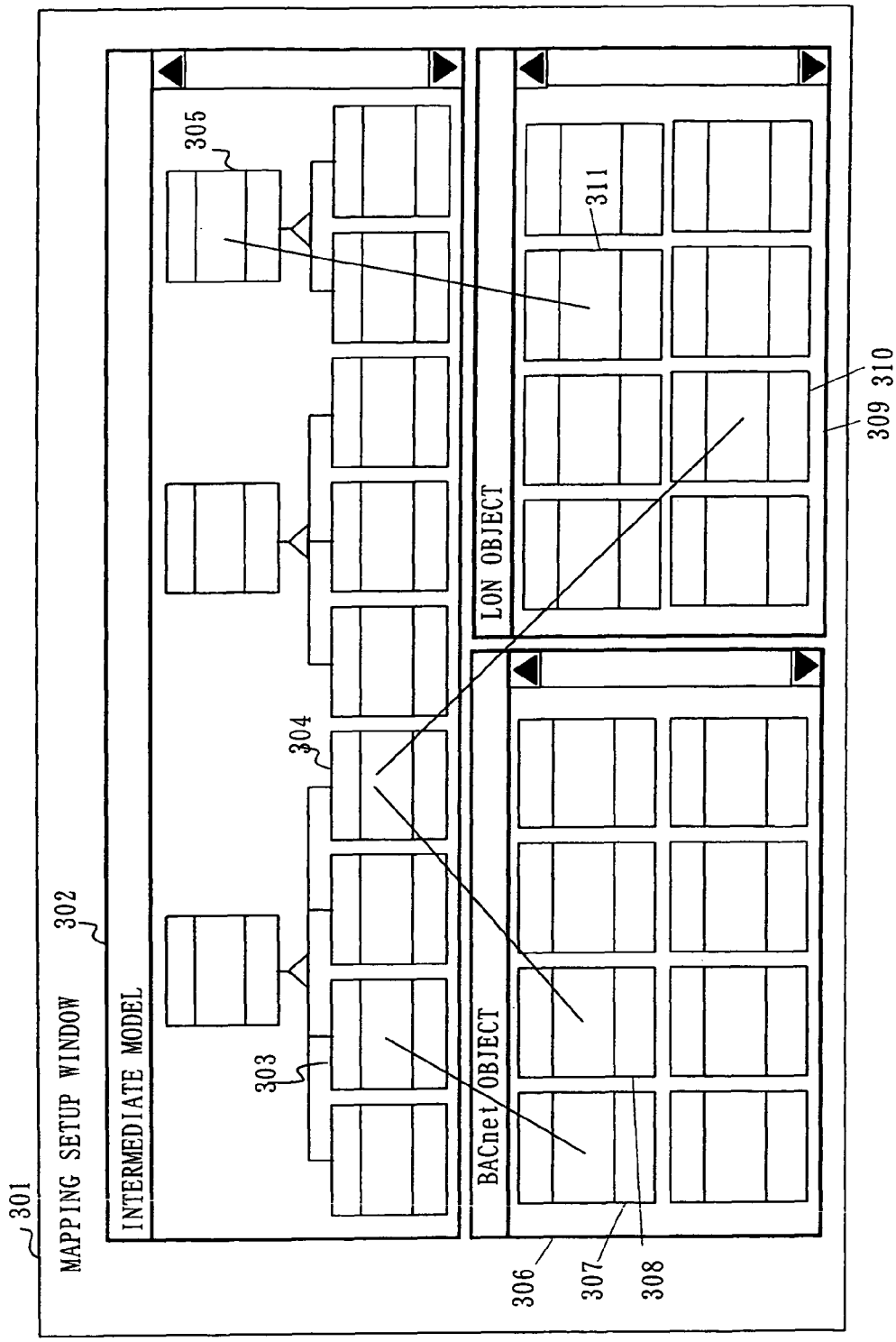
FIG. 3 is a diagram illustrating a mapping display window of intermediate object components according to the first embodiment.

Alternatively, such a setup of mapping may be performed through a setup window 301, for example, like one example shown in FIG. 3.

Specifically, with reference to the figure, it is a possible method that a content 302 of an intermediate model, a content 306 of a BACnet object, and a content 309 of an LON object are displayed, and then a corresponding object (at the instance level. Alternatively, a class level mapping may be applied.), a corresponding property, or the like is selected from among those. For example, a BACnet object 308 is mapped to an intermediate model object 304, and an LON object 310 is mapped to the intermediate model object 304. As a result, the BACnet object 308 and the LON object 310 will be mapped to each other. The mapping setup window 301 may display at the same time objects of both network systems which are wished to be mapped to each other like the example shown in the figure. Alternatively, however, each one of the objects may be displayed at a time for the purpose of allowing the engineer in each network system to make a setup easier. Still alternatively, an input method in the form of chart or the like may be used other than the GUI based setup window introduced here.

Thus, the intermediate model and its constituent intermediate objects, and the system and its system components are displayed on the same window. As a result, it is effective in making mapping much easier.

Note that the intermediate model of the present invention may be placed inside a gateway apparatus and involved even in the execution of a gateway function. Alternatively, however, it may be equipped on a setup tool, which is provided separately from the gateway apparatus, for making various types of setups for the gateway apparatus so that the gateway apparatus is allowed to have minimum required functions for executing the gateway functions only. In this case, it becomes possible to provide a higher performance and lower-cost gateway apparatus.

Another possible approach is that when two systems A and B exchange data with each other, for example, the system A starts to convert it into the intermediate object of the intermediate model and then transmits it, and then the other system B only uses it. This is effective in the case where a subordinate layer system uses data of a host system. Still alternatively, a time gap may exist between setting and using instead of them being done at exactly the same time. Still more, another possible approach is that an intermediate object which has been set up by the system A is set up in advance for use or will be set up at a later time by the system B, and then shortly after data is set up, the intermediate object transits item data.

Furthermore, although a description has been given above in the case where the system starts to set up the intermediate object, another possible approach is that the intermediate model is setup first and then mapping is made to the systems A and B from the intermediate model, and in other words, a correspondence is established between the systems in advance based on the intermediate model. In this case, data is exchanged via the intermediate model at the time of setup, but it is allowed during the operation of the systems to exchange data directly between the systems.

Only to exchange data directly, or only to retrieve an intermediate object, including this case, it is enough that a gateway apparatus has a simple configuration including such as a table. Then, exclusively for mapping, a separately provided setup tool may be used.

Thus, according to this implementation system of mapping between different networks, the intermediate model 102 is established through modeling based on the concept and property shared by the network systems 105 and 107 to be mapped, or using an original model. Then, each of the systems 105 and 107 performs mapping exclusively to the intermediate model 102. Consequently, the BACnet object 106 of the BACnet system 105 which is one of the network systems mapped to the shared object 103 of the intermediate model and the LON object 108 of the LON system 107 which is the other system are mapped to each other. This allows any engineer to set up mapping even if he/she does not have full knowledge about the both network systems.

In addition, even if a change occurs at one of the network systems, the change will not affect the setup information of the other network system.

Additionally, by the method of mapping with the view of the intermediate model 102 being provided and the view of each network 105, 107 being established, the mapping may be performed further with ease.

Embodiment 2.

Figure 4:
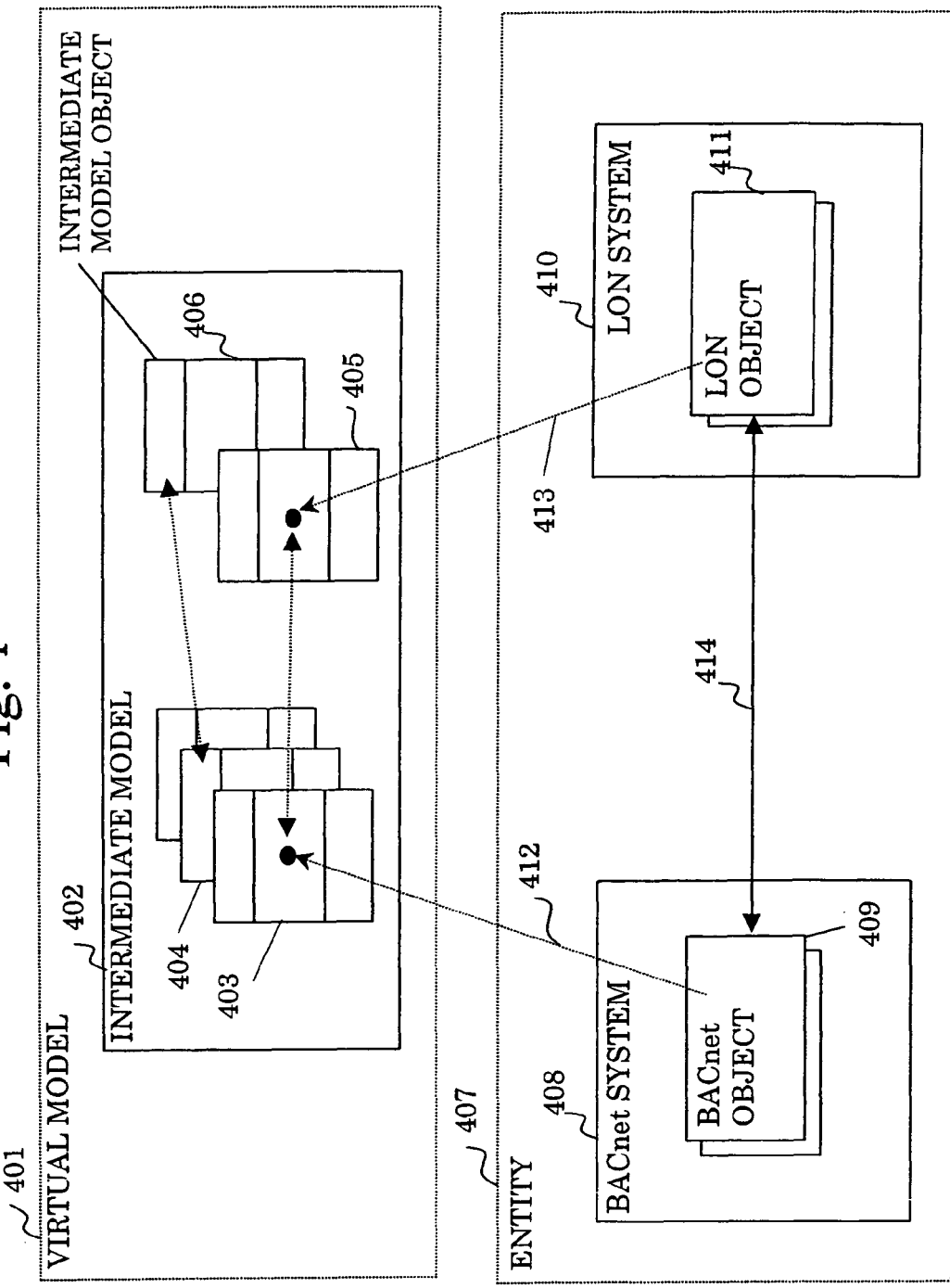
FIG. 4 is a structural view illustrating mutually used systems and an intermediate model in concrete according to a second embodiment of the present invention.

A second embodiment of the present invention will be discussed below with reference to FIG. 4. As cited in the first embodiment, a BACnet system 408 and a LON system 410 will be cited also here as the network systems of real entities.

Based on the first embodiment, a BACnet object 409 and a LON object 411 will be mapped to each other in the case where they are mapped to a shared intermediate model object when they are mapped to an intermediate model 402. However, it is also possible to map the real entities to each other not by thus mapping to an intermediate model object which is completely in agreement therewith or a shared or common object alone, but by another method. Specifically, different intermediate model objects are setup temporarily, and these intermediate models are combined based on those pieces of mapping information. After the intermediate models are combined, the real entities are to be mapped to each other.

More specifically, it may be accomplished, even if the intermediate model is not completely in agreement therewith, by mapping between ones whose parents are in the same class, whose properties agree more than a given rate (for example, 80% or more), or the like. For example, since the properties of intermediate model objects 403 and 405, and the properties of intermediate model objects 404 and 406 agree more than a given rate, respectively, it is assumed that they are to be mapped to each other, respectively. In this case, the BACnet object 409 which is mapped through mapping 412 to the intermediate model object 403 and the LON object 411 which is mapped through mapping 413 to the intermediate model object 405 are to be mapped to each other through mapping 414 after the intermediate model objects 404, 406 and the intermediate model objects 403, 405 are combined, respectively.

Thus, according to the implementation system of mapping between different networks of this embodiment, when each network system 408, 410 of a real entity performs mapping to the middle model 402, even if the objects 409, 411 of the respective network systems have been mapped differently from each other to the intermediate model objects 403, 405, respectively, mapping is performed based on similarity between the intermediate model objects 403 and 405. As a result, a simpler and easier setup may be performed. Hence, it becomes possible to aim at reduction of engineering cost.

Embodiment 3.

A third embodiment of the present invention will be discussed below with reference to FIG. 5. As cited in the first and second embodiments, a BACnet system 505 and a LON system 510 will be cited also here as the network systems of real entities.

Based on the first and second embodiments, if a BACnet object 506 and a LON object 511 are mapped to an intermediate model 502 so as to obtain mapping 517 between the real entities, the mapping information is to be obtained based on the condition that they have been mapped to a shared intermediate model object, or that they have been mapped to different intermediate model objects to which the respective objects have been mapped, respectively. According to this embodiment, however, in addition to that, supplementary information assigned individually to the objects of the network systems of the real entities is employed. Note that the intermediate model may be handled through the method of the first embodiment or that of the second embodiment. FIG. 5, specifically, shows the case of using the method of the first embodiment. This supplemental information is defined as information that is used to characterize the entity of each object and map the network systems to each other.

Figure 5:
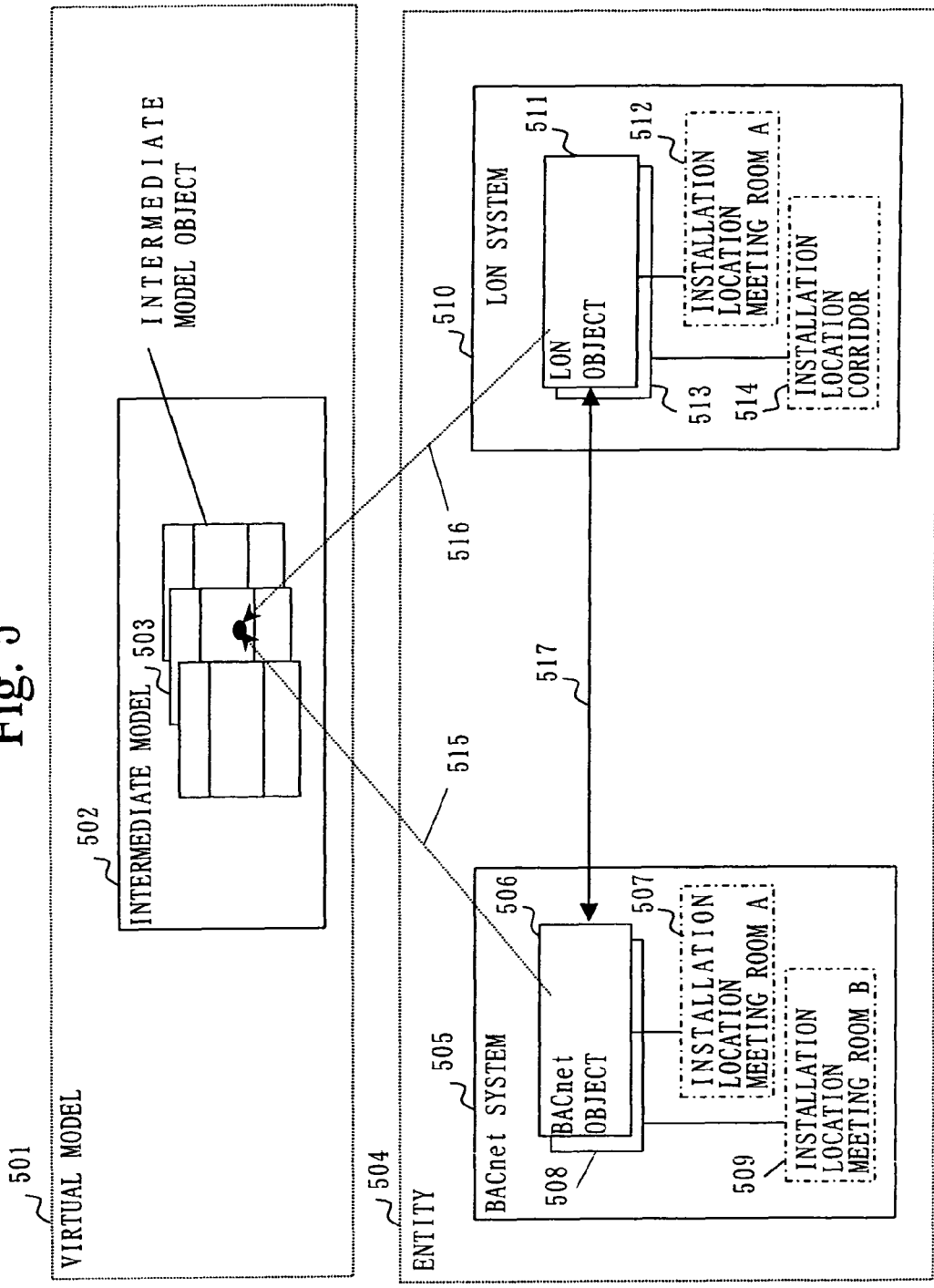
FIG. 5 is a structural view illustrating mutually used systems and an intermediate model in concrete according to a third embodiment of the present invention.

Note, for example, that installation location information is used as the supplemental information in the example shown in FIG. 5. This supplemental information specifies the location where the objects to be combined have been installed. As the supplemental information of the BACnet object 506, installation location 507 has a value of "Meeting Room A". Similarly, it is assumed that installation location 509 of the BACnet object 508 has a value of "Meeting Room B". Installation location 512 of the LON object 511 has a value of "Meeting Room A". Installation location 514 of the LON object 513 has a value of "Corridor". Mapping information between the objects of the real entities are obtained based on those pieces of information in addition to the same method as that of the first embodiment. In FIG. 5, it seems that the BACnet object 506 and the LON object 511, which are mapped to a shared intermediate model object 503, have been mapped to each other. However, if the supplemental information of those objects is obtained, it is known that they share the installation location of "Meeting Room A". This also proves that this is an appropriate mapping.

Note that, as the supplemental information, other than the installation location (Room Name, Room Number, Space Name (Corridor, Stair Landing, Shared Space, etc.), Floor Number, Section Number, Direction, etc.) shown in FIG. 5, the use of Device Model/Model Name, Model Number, Used Scene (normal, emergency, breakdown, etc.), Specific Sign or ID Number defined assigned to each article or the like may be effective.

Thus, according to the implementation system of mapping between different network systems of this embodiment, the supplemental information for mapping between the objects of the network systems 505 and 510 is defined, the supplemental information is assigned to the respective objects of the network systems 505 and 510, and mapping is performed in consideration of this supplemental information. This allows a more precise mapping to be generated, and also mapping appropriateness to be judged. In addition, since each object is assigned the supplemental information and mapping is performed based on this information, supplemental information based analogy becomes possible even if it is separated from the intermediate model as a result of failing to make an initially established mapping assumed to the intermediate model 502 which is caused by an operational change in the network systems 505 and 510 or the like. Thus, it becomes possible to analogize and maintain the relation of mapping between the network systems 505 and 510. Hence, it becomes possible to aim at reduction of engineering cost.

Thus, with the supplemental information added, there is an effect of providing a more precise matching when component data of other systems is used.

Note, even with the first and second embodiments, that XML (short for extensible Markup Language) as a structured data description language may be used for a simpler description when mapping to an intermediate model or an intermediate object, which will be discussed in detail in the following embodiments.

Embodiment 4.

Figure 6:
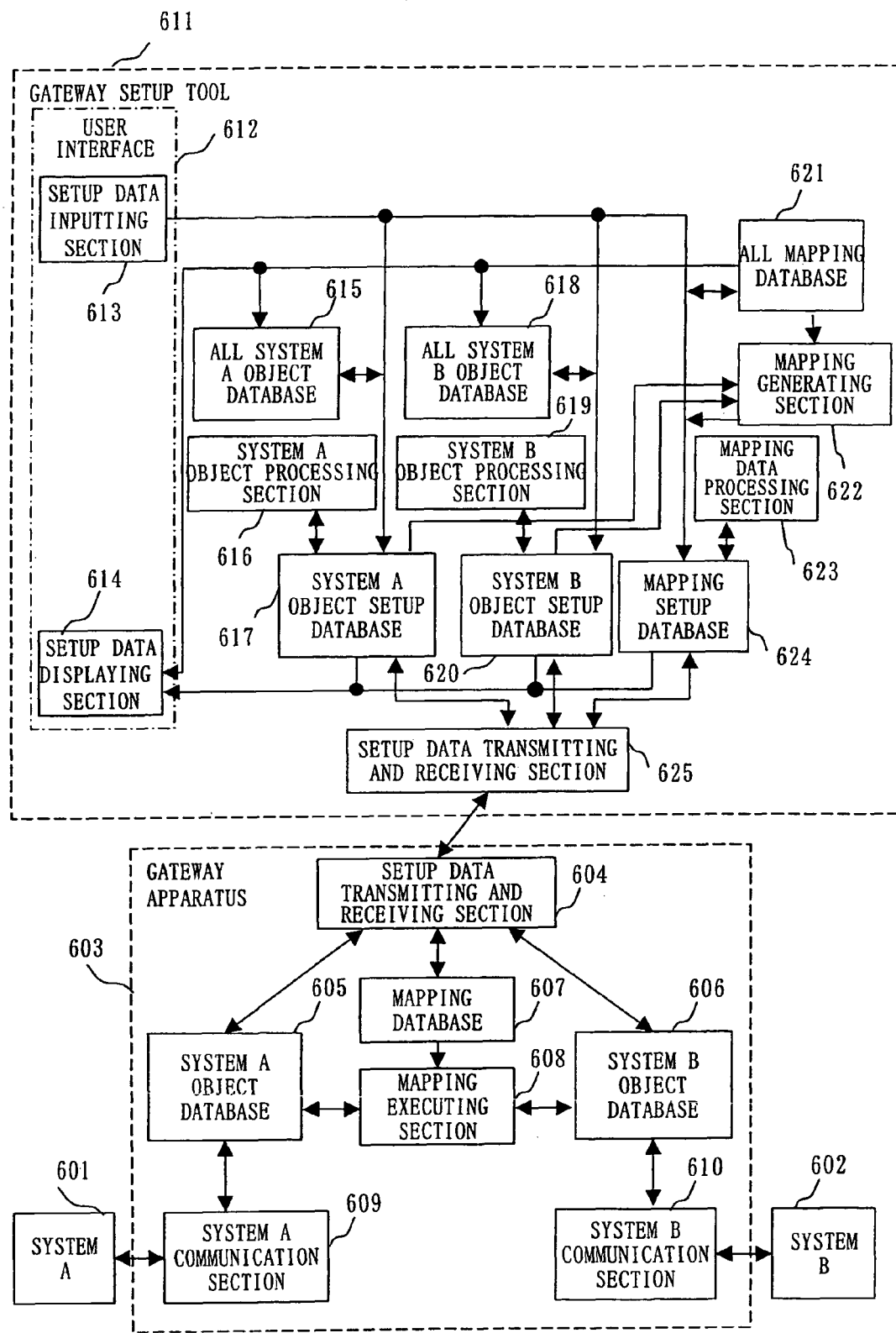
FIG. 6 is a block diagram of a gateway apparatus and a gateway setup tool according to a fourth embodiment of the present invention.

FIG. 6 is a block diagram of a gateway apparatus and a gateway setup tool according to a fourth embodiment of the present invention.

With referring to the figure, it is composed of a system A 601, a system B 602 which is built on a protocol different from that on which the system A 601 is built, and a gateway apparatus 603 which connects the system A 601 and the system B 602.

The gateway apparatus 603 is composed of a setup data transmitting and receiving section 604, a system A object database 605 holding data on various devices connected to the system A 601 and various objects to be monitored and controlled and the like by the system A 601, a system B object database 606 holding data on various devices connected to the system B 602 and various objects to be monitored and controlled and the like by the system B 602, a mapping database 607 showing correspondence among those databases, a mapping executing section 608, a system A communicating section 609, and a system B communicating section 610. The information in the various databases is stored in a memory portion of the gateway apparatus 603.

Also, a gateway setup tool 611 is provided for an external setup of the object data and the mapping data of the gateway apparatus 603.

The gateway setup tool 611 is composed of a setup data inputting section 613 as a user interface 612, a setup data displaying section 614, an all system A object database 615, a system A object processing section 616, a system A object setup database 617, an all system B object database 618, a system B object processing section 619, a system B object setup database 620, an all mapping database 621, a mapping generating section 622, a mapping data processing section 623, a mapping setup database 624, and a setup data transmitting and receiving section 625. The information in the various databases is stored in a memory portion of a computing device that implements the gateway setup tool 611.

Figure 7:
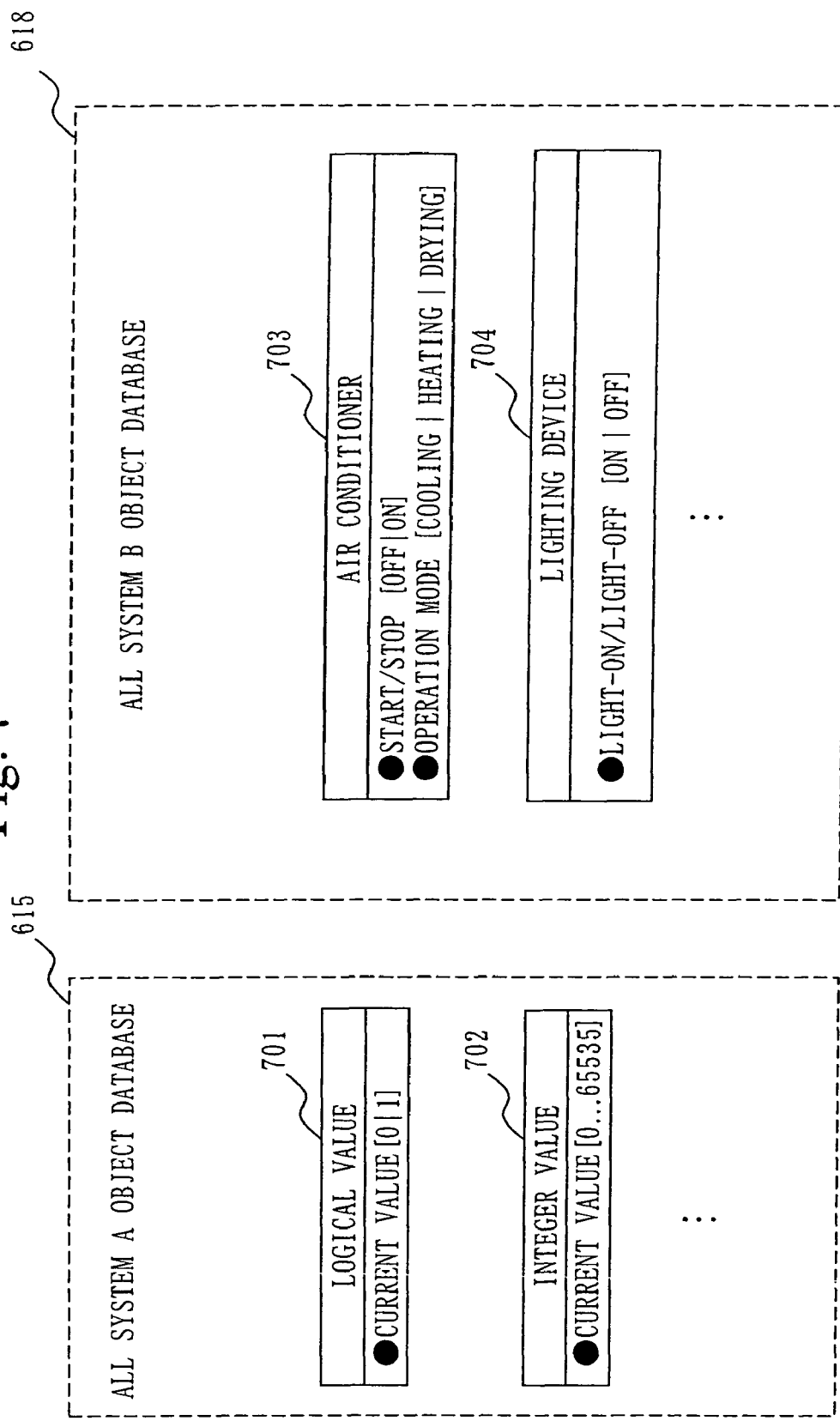
FIG. 7 shows an example of data in an all object database of the gateway setup tool according to the fourth embodiment of the present invention.

FIG. 7 shows an example of data in the all system A object database 615 and the all system B object database 618 in the gateway setup tool 611 according to a fourth embodiment of the present invention.

The figure shows a Logical Value object 701 and an Integer Value object 702 in the all system A object database 615. The all system B object database 618 includes an Air Conditioner object 703 and a Lighting Device object 704.

More specifically, the Logical Value object 701 has a property called Current Value, an available value of which is 0 or 1. Then, the Air Conditioner object 703 has two properties called Start/Stop and Operation Mode, the available values of which are "Start or Stop" and "Cooling or Heating or Drying", respectively.

Figure 8:
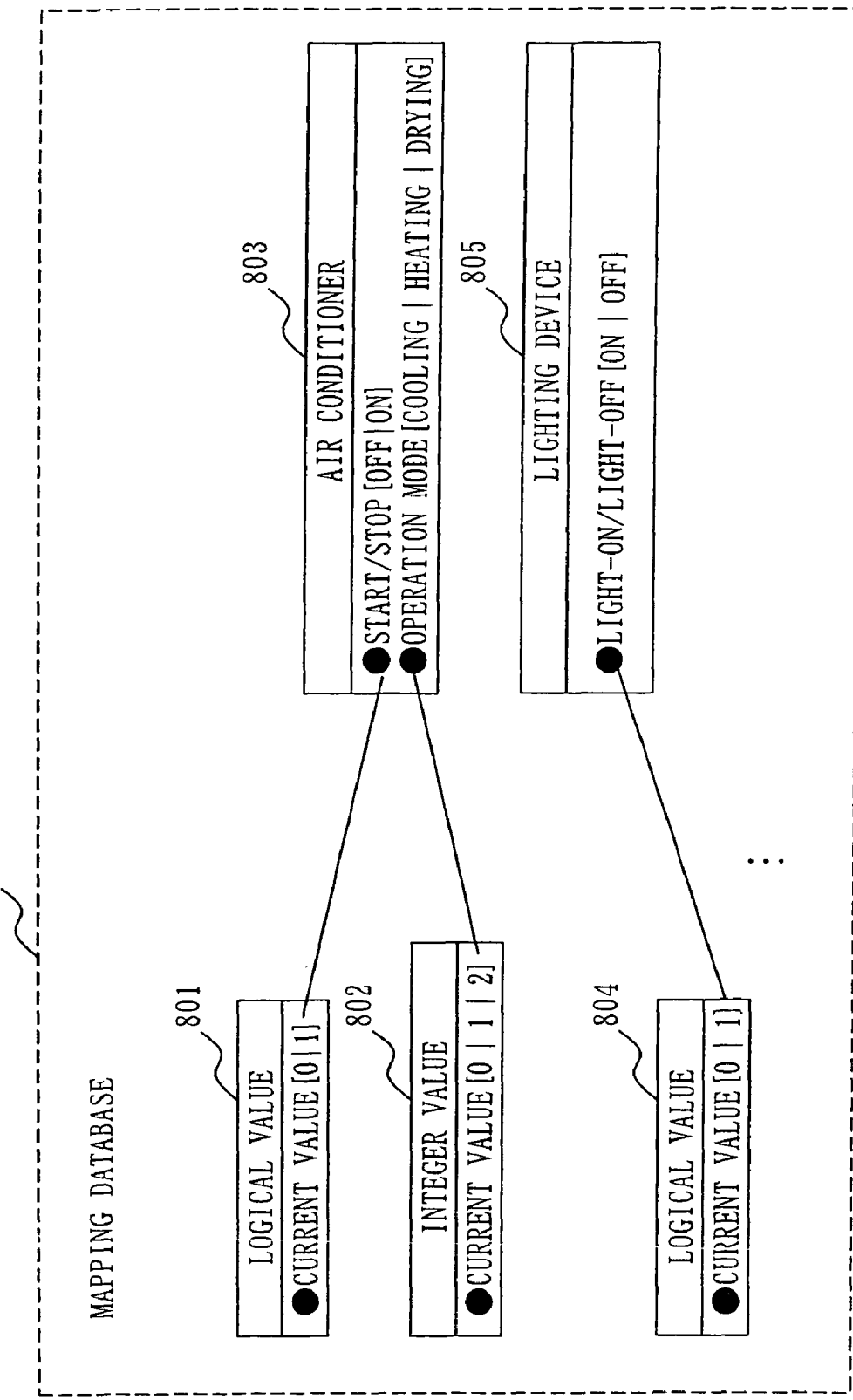
FIG. 8 shows an example of data in an all mapping database of the gateway setup tool according to the fourth embodiment of the present invention.

FIG. 8 shows an example of data of the all mapping database 621 in the gateway setup tool 611 according to the fourth embodiment of the present invention.

The figure shows a Logical Value object 801, an Integer Value object 802, an Air Conditioner object 803, and a Lighting Device object 804.

As shown in the figure, the Logical Value object 801 and the Integer Value object 802 correspond to the Air Conditioner object 803, respectively.

More specifically, the Current Value property of the Logical Value object corresponds to the Start/Stop property of the Air Conditioner object, and the Current Value property of the Integer Value object corresponds to the Operation Mode property of the Air Conditioner object.

Furthermore, with referring to the value of each property, values 0, 1 of the Current Value property of the Logical Value object 801 correspond to Stop and Start, respectively, of the Start/Stop property of the Air Conditioner object 803. Values 0, 1, and 2 of the Current Value property of the Integer Value object 802 correspond to Cooling, Heating, and Drying, respectively, of the Operation Mode property of the Air Conditioner object 803.

An operation will be discussed with reference to FIG. 6 to FIG. 8.

First, an operation will be discussed with reference to FIG. 6 in the case where the system A 601 starts to communicate with the system B 602 for control.

With referring to the figure, a communication command of the system A 601 transmitted from the system A 601 and reached the gateway apparatus 603 is received by the system A communicating section 609, where the content of the communication is interpreted. Then, it is acknowledged that the content indicates a control from the system A 601 to the system B 602. Then, this control data is written into the system A object database 605.

The mapping executing section 608 searches the mapping database 607 for object of the system B 602 which corresponds to the system A object database 605 into which the control data has been written. Then, the mapping executing section 608 writes the control data of the system B 602 corresponding to the control data of the system A 601 obtained with reference to the mapping database 607 into the system B object database 606.

The system B communicating section 610 creates a communication command of the system B 602 corresponding to the system B object database 606 into which the data has been written, and outputs it to the system B 602.

Thus, the communication for control is performed from the system A 601 to the system B 602.

Note that a communication performed from the system B 602 to the system A 601 is carried out through the route in a reverse way to that discussed above.

Next, a method for setting up the system A object database 605, the system B object database 606, and the mapping database 607 which are used for such a communication will be discussed with reverence to FIG. 7 and FIG. 8.

With the gateway setup tool 611, the data of various devices connected to the system A 601, the data of various objects to be monitored and controlled by the system A 601 and the like are inputted to the system A object setup database 617 through the setup data inputting section 613. Also, through the same inputting section, the data of various devices connected to the system B 602, the data of various objects to be monitored and controlled by the system B 602 and the like are inputted to the system B object setup database 620. Furthermore, through the same inputting section, information on correspondence between those databases is inputted to the mapping setup database 624.

Alternatively, however, information on the all system A object database 615 and the all system B object database 618 which are provided in the gateway setup tool 611 in advance, like the one shown in FIG. 7 for example, may be used. Specifically, the all system A object database 615 is a database for the model data of various objects which are available in the system A 601, and the information of the all system B object data base 618 is a database for the model data of various objects which are available in the system B 602.

Similarly, information on the all mapping database 621 which is model data for mapping between the system A 601-the system B 602, like one shown in FIG. 8 for example, may be used.

Still alternatively, when these pieces of data is inputted, setup information of the system A object setup database 617, the system B object setup database 620, and the mapping setup database 624, the information of the input status thereof or the like may be provided by means of the setup data displaying section 614 so as to help a setter input those items of data.

Data thus inputted to the system A object setup database 617, the system B setup database 620, and the mapping setup database 624 is usually complied to be intelligible to the setter. Or, all correspondence elements are held in the form as they are. For that reason, it is in many cases redundant as data to be held in the execution environment on the gateway apparatus 603.

A real system includes many devices, and therefore information on correspondence which is provided individually for each device such as the Logical Value object 804 and a Lighting Device object 805 shown in FIG. 8 is required. Specifically, information for identifying the individual of each device, such as a Logical Value Object 5002 and a Lighting Device Object 2001, and a Logical Value Object 5004 and a Lighting Device Object 2002, is required at the same time. That means information to be held may be indicated as (a Logical Value, 5002, a Current Value) v. (a Lighting Device, 2001, Light-On/Light-Off), (a Logical Value, 5004, a Current Value) v. (a Lighting Device, 2002, Light-On/Light-Off) and so on. However, a relationship (a Logical Value, a Current Value) v. (a Lighting Device, Light-On/Light-Off) is common through all the devices and therefore it is redundant to hold the information including repetitions of these through all the devices.

As a solution, the relationship (a Logical Value, a Current Value) v. (a Lighting Device, Light-On/Light-Off) is held only once, and then the correspondence of individual identification information, that is, (5002, 2001), (5004, 2002) and so on may be held separately. This allows a total amount of information to be compressed.

Thus, the system A object processing section 616, the system B object processing section 619, the mapping data processing section 623 normalize the inputted system A object setup database 617, system B object setup database 620, and mapping setup database 624 in order to minimize the redundancy of data to be held on the gateway apparatus 603, and transform them into the form of minimum required data in order to operate in an execution environment.

The system A object setup database 617, the system B object setup database 620, and the mapping setup database 624 transformed into data ideal for the execution environment on the gateway apparatus 603 through those components are transmitted to the gateway apparatus 603 by the setup data transmitting and receiving section 625, and received by the setup data transmitting and receiving section 604 on the gateway apparatus 603.

The system A object setup database 617, the system B object setup database 620, and the mapping setup database 624 received are held on the gateway apparatus 603 as the system A object database 605, the system B object database 606, and the mapping database 607, respectively, to be used for a mutual communication between the system A 601 and the system B 602.

Note that, if the above mentioned procedure is reversed, the system A object database 605, the system B object database 606, the mapping database 607 on the gateway apparatus 603 are transmitted to the gateway setup tool 611 by the setup data transmitting and receiving section 604. Then, the setup data transmitting and receiving section 625 of the gateway setup tool 611 places received data in the system A object setup database 617, the system B object setup database 620, the system B object setup database 620, and the mapping setup database 624, respectively. Then, they are presented to the setter by the setup data displaying section 614. This allows the current setup status of the gateway apparatus 603 to be acquired and displayed.

Note that by further repeating the set up operation in this current setup status, it is possible to change and update the setup.

Still more, the mapping setup database 624 may be generated automatically by the mapping generating section 622 by using the information of the all mapping database 621 which is the model of mapping, the information of such as the system A object setup database 617 and the system B object setup database 620 which have been set up in agreement with the current system, and the like.

Next, FIG. 9 is a simplified diagram illustrating connection types between the gateway apparatus 603 and the gateway setup tool 611 according to the fourth embodiment of the present invention.

Specifically, FIG. 9(a), (b) show simplified views, respectively, of a connection type using a physical medium which is different from the respective systems and a connection type using the same physical medium. Portions which are the same as or equivalent to those of FIGS. 6 through 8 are assigned the same numerals as those, and will not be discussed here.

The figure shows building management systems 901, 911, building management devices 902, 912, LANs (short for Local Area Network) 903, 913, gateway setup tools 904, 914, gateway apparatuses 906, 915, an interface 905 for connecting the gateway apparatus and the gateway setup tool, equipment systems 907, 916, equipment network systems 908, 917, air conditioners 909, 918, lighting devices 910, 919. The figure also shows a first protocol 920 and a second protocol 921 which are different from each other.

Note that the connection type shown in FIG. 9(b) may be configured, as one example, by using Ethernet (registered trade name) as the LAN 913, BACnet (short for A Data Communication Protocol for Building Automation and Control Networks) as the first protocol 920 connecting the building management system 911 and the gateway apparatus 915, and HTTP (short for Hyper Text Transfer Protocol) as the second protocol 921 for connecting the gateway setup tool 914 and the gateway apparatus 915.

Note also that, with the connection type of FIG. 9(b), it is also possible that the gateway setup tool 914 obtains the system information of the building management system 911, that is, information corresponding to the system A object data 605 or the system A object setup data 617 in FIG. 6, directly from the building management system 911 with no involvement of the gateway apparatus 915.

With either one of the connection forms of FIG. 9(a), (b), in the case where a protocol on which the building management system 911 is built is differ from that on which the gateway setup tool 914 is built, an original protocol for direct transfer may be used for data transfer. Then, if it is the same protocol, of the protocol is the same, that protocol or the original protocol may be used.

Thus, with the gateway apparatus according to the fourth embodiment of the present invention, it is allowed that the data of a system to be connected is created by the gateway setup tool 611 which is provided outside of the gateway apparatus 603 and exchanged. As a result, it becomes possible to provide the gateway apparatus which may be flexible in handling a change in a system to be connected, a change in mapping specification or a change in mapping algorithm with no involvement of updating software in the gateway apparatus.

In addition, it becomes unnecessary to perform a complicated operation on the gateway apparatus such as the process of generating and updating mapping information based on setup data. For that reason, an MPU (short for Micro Processor Unit) or memory which is built in the gateway apparatus is not necessarily highly efficient. Hence, it becomes possible to provide the gateway apparatus whose development cost, engineering cost, and hardware cost are held down low.

In addition, by thus separating the gateway setup tool 611 from the gateway apparatus 603 which performs communication between the system A 601 and the system B 602, the design flexibility of the gateway setup tool 611 is enhanced. As a result, a sophisticated user interface is allowed to be provided privately. Hence, it becomes possible to provide the gateway setup tool 611 whose setting efficiency is enhanced and engineering cost is held down low.

In addition, by thus using the mapping generating section 622 for generating mapping data, it becomes possible to carry out a setup operation easily with no need of full knowledge about the systems on both sides to be connected including correspondence. Hence, it becomes possible to provide the gateway setup tool 611 whose engineering cost is reduced.

Note that although the interface 905 is separated from the gateway apparatus 906 in FIG. 9, it may alternatively be built in the gateway apparatus 906.

As mentioned above, it is allowed that the data of a system to be connected is created by the gateway setup tool which is provided outside of the gateway apparatus and exchanged. As a result, it becomes possible to provide the gateway apparatus which can be flexible in handling a change in a system to be connected, a change in mapping specification or a change in mapping algorithm with no involvement of updating software in the gateway apparatus.

In addition, it becomes unnecessary to perform a complicated operation on the gateway apparatus such as the process of generating and updating mapping information based on setup data. For that reason, an MPU or memory which is built in the gateway apparatus is not necessarily highly efficient. Hence, it becomes possible to provide the gateway apparatus whose development cost, engineering cost, and hardware cost are held down low.

In addition, by thus separating the gateway setup tool from the gateway apparatus, the design flexibility of the gateway setup tool is enhanced. Accordingly, with a sophisticated user interface provided privately, it becomes possible to provide the gateway setup tool whose engineering cost is held down low.

Embodiment 5.

A fifth embodiment of the present invention relates to mapping generation performed by the gateway setup tool.

Figure 10:
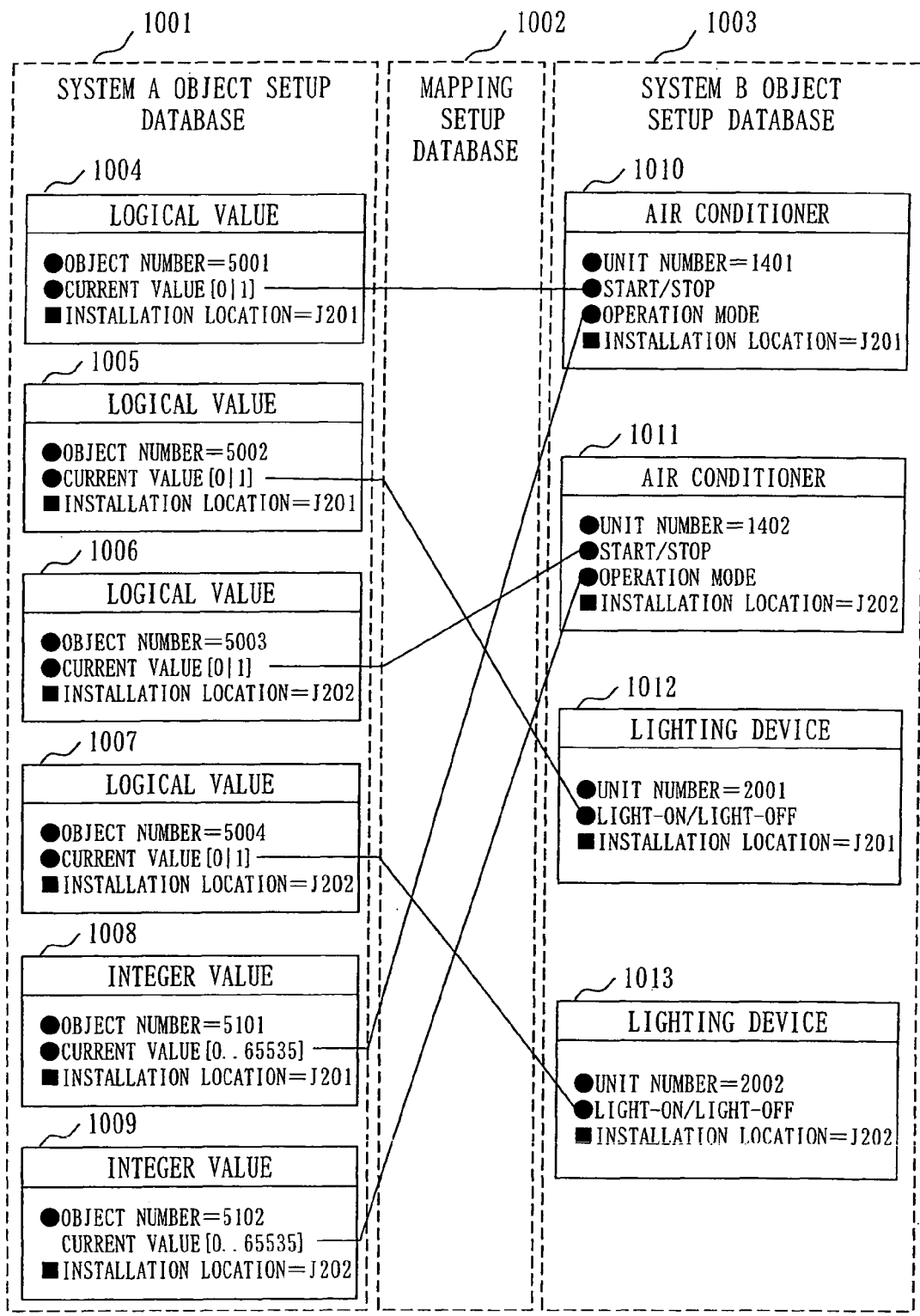
FIG. 10 shows an example of data in a system A object setup database, a system B object setup database, a mapping setup database of a gateway setup tool according to a fifth embodiment of the present invention.

FIG. 10 shows an example of automatic mapping generation in which supplemental information for mapping is added to the setup data of each object according to the fifth embodiment of the present invention. Portions which are the same as or equivalent to those of the fourth embodiment are assigned the same numerals as those, and will not be discussed here.

With referring to the figure, the system is composed of a system A object setup database 1001, a mapping setup database 1002 and a system B object setup database 1003. It further includes Logical Value objects 1004~1007, Integer Value objects 1008, 1009, Air Conditioner objects 1010, 1011, and Lighting Device objects 1012, 1013.

With the system A object setup database 1001, the Logical Value objects with object numbers=5001, 5002, 5003, 5004 and the Integer Value objects with object numbers=5101, 5102 are defined. With the system B object setup database 1003, the Air Conditioner objects with unit numbers=1401, 1402, and the Lighting Device objects with unit numbers=2001, 2002 are defined.

Note that a black circle ● is marked, in the figure, at the front of the property of minimum required information as an object representing a device or a object to be monitored and controlled.

Besides that, a black square ■ is marked at the front of the Installation Location property as the supplemental information of each object. The value of this property is to include information identifying where in the article a device or an object to be monitored and controlled which is represented by each object is installed.

Specifically, with the Air Conditioner object 1010 having the unit number 1401, for example, information identifying that it is an object representing a device which is installed in "J201" is to be added. With the Logical Value object 1006 having the object number 5003, information identifying that it is an object representing an object to be monitored and controlled which is installed in "J202" is to be added.

Next, a procedure for generating mapping will be discussed based on groups of the objects of both the system A and the system B which are provided with supplemental information.

Figure 11:
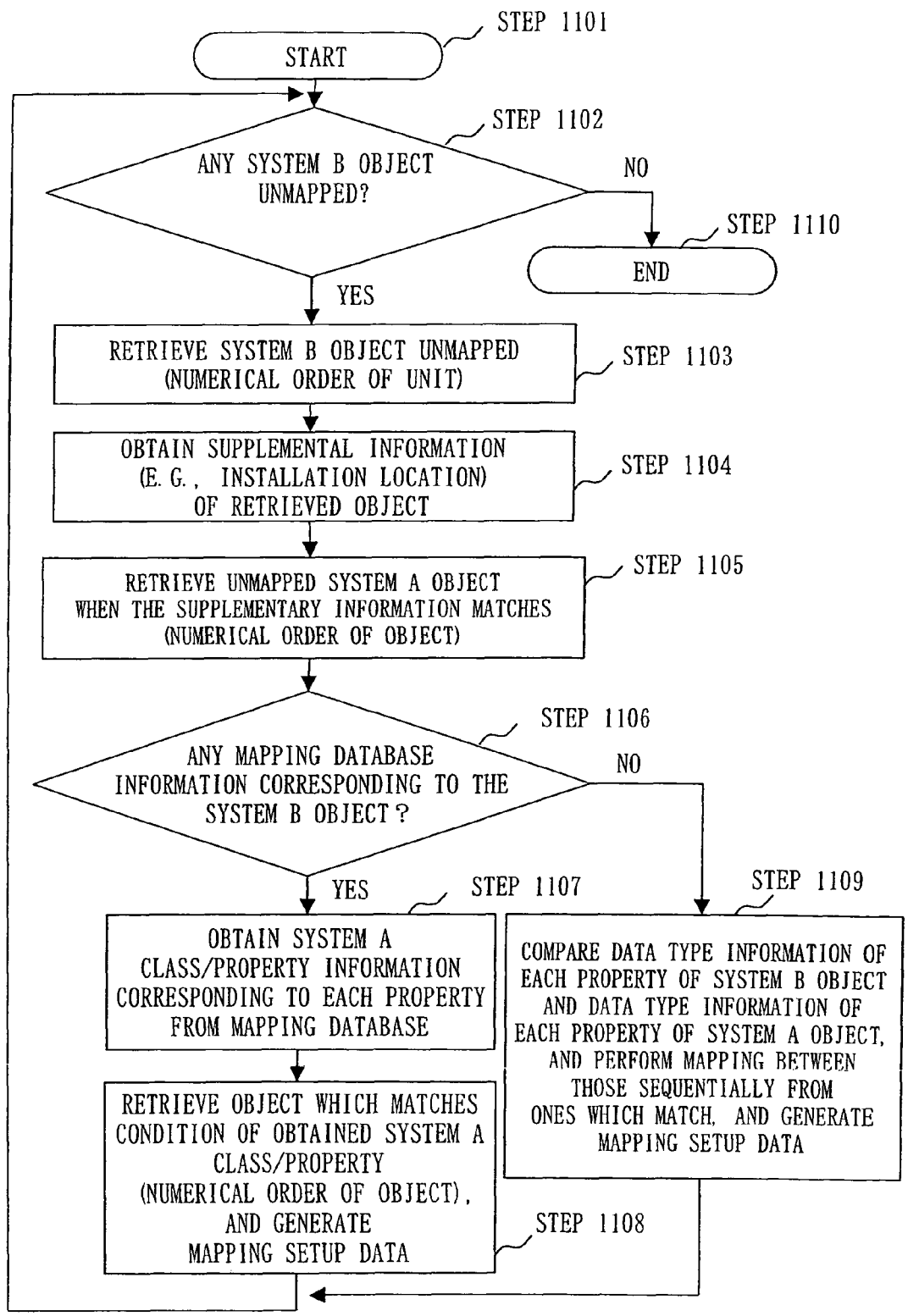
FIG. 11 is a flow chart illustrating an automatic mapping generation procedure in the gateway setup tool according to the fifth embodiment of the present invention.

FIG. 11 is a flow chart illustrating an example of a procedure for mapping generation performed by the gateway setup tool. The procedure will be discussed with reference to the figure.

It is assumed here that objects of the system A are objects to be monitored and controlled and objects of the system B are device objects. Then, a description will be given in the case where the former is mapped sequentially to the latter. Note that even if they are in opposite relation or they map to each other, the result is the same.

First, when the operation starts (step 1101), unmapped objects are retrieved sequentially among system B objects (step 1102). If all the mapping has already been completed, then the process jumps to the end (step 1110).

In the case where an unmapped object exists, then the unmapped object is retrieved (step 1103), and the supplemental information of the retrieved object is obtained (step 1104).

A series of those steps correspond to retrieving the Air Conditioner object with the unit number=1401 and obtaining the information of "Installation Location=J201" in FIG. 10.

Then, unmapped system A objects whose supplemental information is in agreement with it are retrieved in numerical order (step 1105). This step corresponds to retrieving the Logical Value objects with the object numbers=5001, 5002, and the Integer Value objects with the object number=5101, both having "Installation Location=J201" in FIG. 10.

Now, a search is made to check whether mapping database information corresponding to a currently processed system B object exists or not (step 1106). In the case where the mapping database information exists, then the class/property information of the system A corresponding to each property is obtained from the mapping database (step 1107).

Those steps correspond to obtaining the information identifying that the Start/Stop property of the air conditioner 803 corresponds to the Current Value property of the Logical Value object 801, and also obtaining information identifying that the Operation Mode property corresponds to the Current Value property of the Integer Value object 802 in FIG. 8.

Next, objects which are in agreement with the condition of the obtained class/property of the system A are retrieved in numerical order, and mapping setup data is generated (step 1108). This step corresponds to starting to search retrieved objects in agreement with the installation location in numerical order, with respect to the Start/Stop property of the Air Conditioner object with the unit number=1401, for an object which is in agreement with the correspondence information of (an air conditioner, Start/Stop) v. (a logical value, a current value) which is obtained from the mapping database in FIG. 10. The Current Value property of the Logical Value object with the object number=5001 is mapped thereto.

Continuously, it is found from the correspondence information of (an air conditioner, Operation Mode) v. (an integer value, a current value) obtained from the mapping database that the Current Value property of the Integer Value object with the object number=5101 is mapped to the Operation Mode property.

When a mapping generation of mapping setup data is completed for one of the system B objects in this manner, the same is repeated for a next object of the system B objects until no unmapped object exists.

In the case where no mapping database information exists as a result of searching for mapping database information corresponding to a currently processed system B object (step 1106), a comparison is drawn between the data type information of each property of the system B object and the data type information of each property of a system A objet which has been retrieved under the condition that the supplemental information is in agreement with it. Then, they are mapped to each other in order of agreement to generate mapping setup data (step 1109).

Thereafter, the same is performed as that in the case where mapping database information exists. When all the mapping setup data is generated in this manner, such a correspondence as that shown in FIG. 10 is to be established.

Thus, according to the gateway setup tool of the fifth embodiment of the present invention, the supplemental information for mapping objects between the system A and the system B to be connected is defined, and the supplemental information is assigned, respectively, to the object setup data of the system A and the system B so as to generate mapping data between objects. As a result, if the supplemental information is system independent on such as installation location, for example, then it is allowed to perform a setup operation easily with no need of full knowledge of the systems A and B on both sides including correspondence. Hence, it becomes possible to provide the gateway setup tool whose engineering cost is reduced.

Note that it is possible to handle objects which are not available for mapping through error detection caused by indecency in setup information or the like. Alternatively, however, there is another possible method applicable to that case as well. Specifically, a default correspondence between objects on both sides is held in advance like the mapping database, and when the object of one system is set up, the corresponding object of the other system is automatically generated.

As discussed above, the supplemental information for mapping objects between the systems A and B to be connected is defined, and then assigned, respectively, to the object setup data of the systems A and B so as to generate mapping data between the objects. In addition, it is designed that the supplemental information is system independent. As a result, it is allowed to perform a setup operation easily without the need of full knowledge of the systems A and B on both sides including correspondence. Hence, it becomes possible to provide the gateway setup tool whose engineering cost is held down low.

Embodiment 6.

FIGS. 12 and 13 show examples of object setup data and mapping setup data, respectively, written in a structured data description language in the gateway setup tool according to a sixth embodiment of the present invention.

In both cases of FIGS. 12 and 13, the description is give in XML (short for extensible Markup Language) as a structured data description language. Then, it is expressed in the form of "a property name=a property value" with each tag having an object name such as a logical value, an integer value, an air conditioner and a lighting device, and each attribute having a property name and a property value of each object.

The figures each show system A object setup data 1201 written in XML, a structured data description language, system B objet setup data 1202 written in XML in a structured data description language, a Logical Value object 1203 written in XML, a structured data description language, an Integer Value object 1204 written in XML, a structured data description language, an Air Conditioner object 1205 written in XML, a structured data description language, mapping setup data 1301 written in XML, a structured data description language, and mapping data 1302 written in XML, a structured data description language.

For example, the Logical Value object 1203 written in XML, a structured data description language, of FIG. 12 represents that "the value of the Current Value property of the Logical Value object for object number=5001 is 1, and the value of the Installation Location property is J201". The Air Conditioner object 1205 written in XML, a structured data description language, represents that "the value of the Start/Stop property of the Air Conditioner object for the unit number=1401 is Start, and the value of the Operation Mode property is Cooling, and the value of the Installation Location property is J201". These are shown in the form which specifies the property values and correspond to the Logical Value object 1004 and the Air Conditioner object 1010 of FIG. 10, respectively.

Similarly, the example of the mapping setup data written in a structured data description language of FIG. 13 is equivalent to the mapping setup data which illustrates the mapping status of FIG. 10.

For example, the mapping data 1302 written in XML, a structured data description language, represents such a correspondence as (Air Conditioner, 1401, Start/Stop) v. (Logical Value, 5001, Current Value).

By thus describing the system A object setup data, the system B objet setup data, and the mapping setup data in a structured data description language, an interface or data communications between the gateway apparatus and the gateway setup tool, can be depend on the structured data description language. As a result, it becomes possible to handle various changes in data structure in a flexible manner.

Note that descriptions have been given specifically with XML employed so far, but that is not a must. Alternatively, however, any structured data description language may be employed other than XML, such as SGML (short for Standard Generalized Markup Language) and XHTML (short for eXtensible HyperText Markup Language). In particular, if the structured data description language which is available even for a general WEB browser or the like, it is become possible to produce the gateway apparatus and the gateway setup tool by using a generally and widely used general-purpose application program. Hence, it becomes possible to provide a gateway apparatus and a gateway setup tool whose development cost and engineering cost are reduced.

In addition, since the structured data description language is used for the interface between the gateway apparatus and the gateway setup tool, it is become possible to produce the gateway apparatus and the gateway setup tool by using a generally and widely used general-purpose application program such as a WEB browser. Hence, it becomes possible to provide a gateway apparatus and a gateway setup tool whose development cost and engineering cost are held down low.

INDUSTRIAL APPLICABILITY

As discussed above, according to the present invention, it is provided with the intermediate model to be accessed by the other systems, and the intermediate model is provided with the intermediate object which corresponds to a component. Then, each of the systems maps a component of itself to the intermediate object and then transmits the data thereto. In addition, each system is allowed to obtain another system's component data from the intermediate object. Hence, it is effective in making the use of another system's component data easy and minimizing a possible influence of a change occurred in an item of each system on other systems.

The invention claimed is:

1. A gateway apparatus comprising:
a memory portion;
a first object, stored in the memory portion, representing a first component of a first system in an original model, and including first supplemental information characterizing the first component, the first supplemental information being independent of a type of the first system, wherein the first system represents a real entity;
a second object, stored in the memory portion, representing a second component of a second system in the original model, and including second supplemental information characterizing the second component, the second supplemental information being independent of a type of the second system, wherein the second system represents a real entity; and
an intermediate model including a first intermediate object and a second intermediate object, wherein the intermediate model is a virtual model;
wherein the first intermediate object includes a property that corresponds to a property of the first component;
wherein the second intermediate object includes a property that corresponds to a property of the second component;
wherein the gateway apparatus performs mapping between the first intermediate object and the second intermediate object if the property of the first intermediate object and the property of the second intermediate object match by more than a predetermined percentage, and performs mapping between the first object and the second object if the first intermediate object and the second intermediate object are mapped and if the first supplemental information and the second supplemental information match;
wherein data of the property of the first component is transferred to the property of the first intermediate object and the property of the second intermediate object when the first object and the second object are mapped;
and wherein the transferred data is stored in the first intermediate object and the second intermediate object; and wherein the second system, including the component having the property corresponding to the property of the second intermediate object, retrieves the stored data when the data is needed for the second component.

2. The gateway apparatus according to claim 1, wherein the intermediate model and its intermediate objects, and the first system and its components are displayed on a same screen for mapping between the first system and the intermediate model.

3. The gateway apparatus according to claim 1, wherein mapping to the first intermediate object and the second intermediate object is performed by data which is written in a structured data description language.

4. A gateway setup tool, comprising:
a memory portion;
a setup data inputting section setting up groups of objects representing a system A and a system B, respectively;
a system A object setup database holding object data of the system A which is set up by the setup data inputting section;
a system A object data processing section receiving data from the system A object setup database, compressing the data, and returning it;
an all system A object database, stored in the memory portion, including model data of an object available for the system A which exchanges data with the system A object setup database;
a system B object setup database, stored in the memory portion, holding object data of the system B which is set up by the setup data inputting section;
a system B object data processing section receiving data from the system B object setup database, compressing the data, and returning it;
an all system B object database, stored in the memory portion, including model data of an object available for the system B which exchanges data with the system B object setup database;
a mapping setup database, stored in the memory portion, holding mapping data for mapping which is set up by the setup data inputting section;
a mapping data processing section receiving data from the mapping setup database, compressing the data, and returning it;
an all mapping database including model data of mapping between an object available for the all system A object database and an object available for the all system B object database, and exchanging data with the mapping setup database;
a mapping generating section performing mapping between each data of the system A object setup database and each data of the system B object setup database with reference to the all mapping database, and transmitting it to the mapping setup database;
a setup data displaying section displaying data as needed of the system A object setup database, the system B object setup database, the mapping setup database, the all system A object database, the all system B object database, or the all mapping database; and
a setup data transmitting and receiving section for exchanging data among the system A object setup database, the system B object setup database, and the mapping setup database;
wherein the object data of the system A object setup database and the object data of the system B object setup database include supplemental information that is independent of correlation between the system A and the system B; the supplemental information including values of the property of the object data of the system A and a property of the object data of the system B;
wherein the mapping generating section generates mapping data between objects based on the supplemental information and type information of a property of the object data of the system A and a property of the object data of the system B by mapping the object data of the system A to the object data of the system B; and
wherein the setup data transmitting and receiving section transmits the mapping data to a gateway apparatus where the object data of the system A and the object data of the system B are exchanged.

5. The getaway setup tool according to claim 4, wherein the getaway setup tool exchanges data written in a structured data description language with the gateway apparatus.

6. The gateway setup tool of claim 4, wherein the gateway apparatus receiving the mapping data comprises:
a mapping database holding the mapping data; and
a mapping executing section exchanging the object data of the system A and the object data of the system B.

7. The gateway apparatus according to claim 6, wherein the gateway apparatus exchanges data written in a structured data description language with the gateway setup tool.

* * * * *